UNITED STATES PATENT OFFICE.

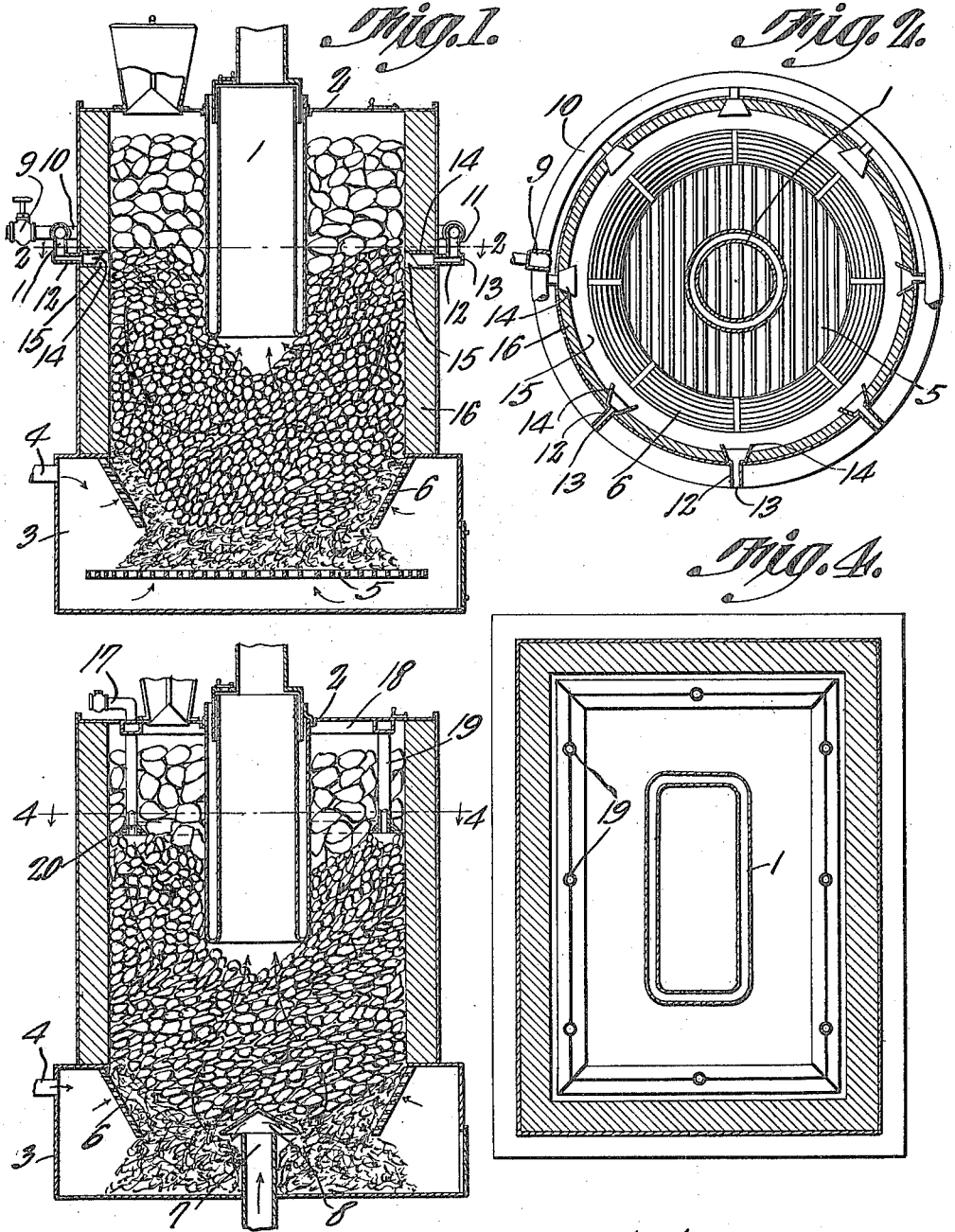

PETER G. SCHMIDT, OF OLYMPIA, WASHINGTON.

PROCESS OF PRODUCING GAS.

1,164,408.

Specification of Letters Patent.

Patented Dec. 14, 1915.

Application filed March 29, 1913. Serial No. 757,672.

*To all whom it may concern:*

Be it known that I, PETER G. SCHMIDT, a citizen of the United States, residing at Olympia, in the county of Thurston and State of Washington, have invented a new and useful Process of Producing Gas, of which the following is a specification.

The present invention relates to improvements in a process of producing gas, in a gas producer, one object of the present invention being the provision of a means, whereby the zone of incandescence is maintained at a point considerably above the inlet end of a centrally disposed gas collector, this zone being maintained by the introduction of currents of air below the top surface of the fuel for the purpose of causing combustion and the incandescent zone to extend around and above the inlet end of the gas collector, thereby causing volatile distillates from the fuel in the upper magazine zone of the fuel bed to pass through said incandescent zone and become fixed gases.

By providing a means for introducing air above the inlet end of the collector and below the upper surface of fuel in the producer, I find that the zone of incandescence can be easily controlled and maintained to a point approximately upon a line with the introduction of the air, the air radiating downwardly and centrally through the fuel body toward the inlet end of the collector thereby causing combustion and fixation of the volatiles of the fuel and delivering a very clean gas.

With the relation existing between the inlet of the collector, the grate and the upper air inlets, in practical operation, I have proven that wall channeling, consequent wall clinkering and destruction of producer lining, is practically eliminated, because the action of the combustion is all toward the centrally disposed inlet of the gas collector. Introducing the upper air into the body of the fuel below the upper surface thereof, also avoids the possible collection of an explosive mixture in the top of the producer. Another of the advantages of introducing the upper air into the body of and below the surface of the fuel instead of above the surface of the fuel is to prevent the air from channeling along the collector wall that would thus ensue.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a vertical central sectional view of one form of gas producer constructed to carry out the present process. Fig. 2 is a section taken on line 2—2 thereof. Fig. 3 is a view similar to Fig. 1 of another form of gas producer employing the same process. Fig. 4 is a section taken on line 4—4 of Fig. 3.

In carrying out the present process, it is desirable a centrally disposed gas collector 1 be provided, the same being properly supported from the top or charging floor 2 of a circular producer as shown in Figs. 1 and 2, or a rectangular producer as shown in Figs. 3 and 4. By this means, the gas collector is projected into the fuel body, the inlet end of the same being within the incandescent zone, the main air supply being fed to the ash pit 3 by means of the conduit 4 so that the same will pass through the ash zone above the grate 5, as shown in Fig. 1 and also through the grate baskets 6, as shown in both Figs. 1 and 3. In the form shown in Figs. 3 and 4, a centrally disposed air supply 7 with a hood 8 is projected into the ash zone, so that in both forms, the main combustion will follow the direction of the arrows and the generated gas enter the lower inlet end of the gas collector 1. The gas collector in Fig. 1 is made cylindrical in form, while that shown in Fig. 3 is rectangular, both forms being water jacketed.

In both forms, the auxiliary supply of air is provided for, the same, in Figs. 1 and 2, being delivered from the valved conduit 9 into the annular header 10 having the depending pipes 11 led into the radial pipes 12. Each of the pipes 12 are provided with the covered poke hole 13 while the inner end leads to a flared nozzle 14, all of these nozzles being disposed in an annular recess 15 formed in the refractory wall 16 of the producer. By this means, the auxiliary air introduced at this point of the producer, that is below the upper surface of the fuel body and in a plane above the inlet end of the gas collector 1 and from points therearound, will maintain the incandescent zone at a point above the lower or inlet end of the gas collector, the auxiliary combustion following the lines of the arrows as clearly shown in Fig. 1.

In the form shown in Figs. 3 and 4, the auxiliary air is supplied from the valved conduit 17 into the distributer 18 carried by the charging floor there being led from such chamber, the depending conduits or pipes 19, whose lower ends project to a point below the surface of the fuel within the producer, terminating in a plane above the lower inlet end of the gas collector 1 and surrounding the same so that the air led therefrom will follow the direction of the arrows as shown in Fig. 3, and thus maintain the incandescent zone at a point above the inlet end of the gas collector. In this form of gas producer, the header 18 is rectangular in outline as is also the water cooled spacing ring 20, which is connected to the lower ends of the air conducting pipes 19, this ring 20 forming a void in the fuel as indicated in Fig. 3, while at the points of introduction in both forms of apparatus, the nozzles 14 and pipes 19 constitute twyers or auxiliary air introducing means.

From the foregoing it is apparent that the present process may be applied both to a cylindrical and rectangular producer, it being essential that the gas collector be disposed in the center, with the auxiliary air introducing means nearer the wall in a plane above the lower inlet end of the gas collector, and below the upper fuel surface.

The air entering the auxiliary air introducing means may be humidified as desired.

What I claim as new is:

A process of producing gas, consisting in admitting air upwardly into a confined fuel charge from below the bottom thereof and throughout the area of the fuel charge, admitting air downwardly into the fuel charge in a horizontal plane below the top of the fuel charge and at all points around the sides of the charge, and withdrawing the gas upwardly centrally of the fuel charge between the lower and upper points of air admission.

In testimony that I claim the foregoing as my own, I have hereto affixed my signature in the presence of two witnesses.

PETER G. SCHMIDT.

Witnesses:
SELINA WILLSON,
I. E. SIMPSON.

Copies of this patent may be obtained for five cents each, by addressing the "Commissioner of Patents, Washington, D. C."